US011881224B2

(12) United States Patent
Wu et al.

(10) Patent No.: US 11,881,224 B2
(45) Date of Patent: Jan. 23, 2024

(54) MULTILINGUAL SPEECH RECOGNITION AND TRANSLATION METHOD AND RELATED SYSTEM FOR A CONFERENCE WHICH DETERMINES QUANTITY OF ATTENDEES ACCORDING TO THEIR DISTANCES FROM THEIR MICROPHONES

(71) Applicant: PEGATRON CORPORATION, Taipei (TW)

(72) Inventors: Yueh-Tung Wu, Taipei (TW); Jun-Ying Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 267 days.

(21) Appl. No.: 17/394,593

(22) Filed: Aug. 5, 2021

(65) Prior Publication Data

US 2022/0076679 A1    Mar. 10, 2022

(30) Foreign Application Priority Data

Sep. 7, 2020 (TW) ................................. 109130562

(51) Int. Cl.
*G10L 15/25* (2013.01)
*B60T 7/22* (2006.01)
(Continued)

(52) U.S. Cl.
CPC .............. *G10L 15/25* (2013.01); *G06V 20/41* (2022.01); *G06V 40/161* (2022.01);
(Continued)

(58) Field of Classification Search
CPC ............ G06F 40/263; B60T 7/22; H04N 7/15
(Continued)

(56) References Cited

U.S. PATENT DOCUMENTS 8,645,121 B2    2/2014  Boyd et al.
10,067,937 B2   9/2018  Crosley
(Continued)

FOREIGN PATENT DOCUMENTS

| CN | 110072075 | * | 7/2019 | |
|----|-----------|---|--------|---|
| CN | 113923395 | * | 7/2020 | ............... H04N 7/15 |

(Continued)

*Primary Examiner* — Farzad Kazeminezhad
(74) *Attorney, Agent, or Firm* — Li & Cai Intellectual Property (USA) Office (57) ABSTRACT

The present invention provides a multilingual speech recognition and translation method for a conference. The conference includes at least one attendee, and the method includes: receiving, at a server, at least one piece of audio data and at least one piece of video data generated by at least one terminal apparatus; analyzing the video data to generate a video recognition result related to an attendance, and an ethnic of the attendee and a body movement, and a facial movement of the attendee when talking; generating at least one language family recognition result according to the video recognition result and the audio data, and obtaining a plurality of audio segments corresponding to the attendee; performing speech recognition on and translating the audio segments; and displaying a translation result on the terminal apparatus. The method further determines a quantity of conference attendees according to their respective distances from their device microphones.

16 Claims, 10 Drawing Sheets

(51) Int. Cl.
*G06F 40/263* (2020.01)
*G06F 16/583* (2019.01)
*H04N 7/15* (2006.01)
*G10L 15/26* (2006.01)
*G10L 15/00* (2013.01)
*G06V 20/40* (2022.01)
*G06V 40/20* (2022.01)
*G06V 40/16* (2022.01)

(52) U.S. Cl.
CPC .......... *G06V 40/171* (2022.01); *G06V 40/172* (2022.01); *G06V 40/20* (2022.01); *G10L 15/005* (2013.01); *G10L 15/26* (2013.01); *B60T 7/22* (2013.01); *G06F 16/583* (2019.01); *G06F 40/263* (2020.01); *H04N 7/15* (2013.01)

(58) Field of Classification Search
USPC .................................................. 704/8; 701/2
See application file for complete search history.

(56) References Cited

U.S. PATENT DOCUMENTS

| | | | |
|---|---|---|---|
| 2008/0126077 A1* | 5/2008 | Thorn | G06F 40/263 704/8 |
| 2015/0336578 A1* | 11/2015 | Lord | B60T 7/22 701/2 |
| 2019/0332680 A1 | 10/2019 | Wang et al. | |

FOREIGN PATENT DOCUMENTS

| | | |
|---|---|---|
| TW | 201612774 A | 4/2016 |
| TW | M532593 U | 11/2016 |
| TW | M556360 U | 3/2018 |
| TW | M574267 U | 2/2019 |

\* cited by examiner

MULTILINGUAL SPEECH RECOGNITION AND TRANSLATION METHOD AND RELATED SYSTEM FOR A CONFERENCE WHICH DETERMINES QUANTITY OF ATTENDEES ACCORDING TO THEIR DISTANCES FROM THEIR MICROPHONES

CROSS-REFERENCE TO RELATED PATENT APPLICATION

This application claims the benefit of priority to Taiwan Patent Application No. 109130562, filed on Sep. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present invention relates to speech recognition and translation technologies, and in particular, to a multilingual speech recognition and translation method based on video data and a related system.

BACKGROUND OF THE DISCLOSURE

In a multilingual conference, real-time speech recognition and translation are performed on conversations of different speakers by using a speech recognition and translation system, so that the conference can proceed more smoothly. The system integrates technologies, such as automated language family recognition, speech recognition, and language translation.

Most existing multilingual speech recognition and translation technologies are to convert speeches to text by using a speech recognition technology and then translate the text. Therefore, the accuracy of speech recognition affects correctness of a translation result.

SUMMARY OF THE DISCLOSURE

In view of the above problems, the present invention provides an innovative method and system for recognizing and translating multilingual speeches in real-time, which can effectively resolve the problems in the situations where homophones and multi-speaker environments cannot be properly handled in conventional technologies. In the present invention, a plurality of states of a conference attendee is determined by using video data of a conference site, and in a speech recognition phase, homophones and multi-speaker environment are recognized by adopting a recognition model, thereby improving the accuracy of speech recognition.

An embodiment of the present invention provides a multilingual speech recognition and translation method for a conference. The conference includes at least one attendee, and the method includes: receiving, at a server, at least one piece of audio data and at least one piece of video data from at least one terminal apparatus; analyzing the at least one piece of video data to generate a first video recognition result and a second video recognition result, where the first video recognition result includes an attendance and an ethnic of the at least one attendee, and the second video recognition result includes a body movement and a facial movement of the at least one attendee when talking; generating at least one language family recognition result based on the first video recognition result and the at least one piece of audio data; splitting the at least one piece of audio data based on the first video recognition result and the second video recognition result to generate a plurality of audio segments corresponding to the at least one attendee; performing speech recognition on the audio segments according to the at least one language family recognition result to convert the audio segments to a text content; translating the text content according to the at least one language family recognition result; and displaying the translated text content on the at least one terminal apparatus.

The present invention provides a server for a conference. The conference includes at least one attendee. The server includes: a video pre-processing module, a speech recognition module, and a translation module. The video pre-processing module is configured to generate a first video recognition result and a second video recognition result according to at least one piece of video data transmitted by at least one terminal apparatus. The first video recognition result includes an attendance and an ethnic of the at least one attendee, and the second video recognition result includes a body movement and a facial movement of the at least one attendee when talking. The speech recognition module is configured to generate at least one language family recognition result based on the first video recognition result and the at least one piece of audio data; and split the at least one piece of audio data based on the first video recognition result and the second video recognition result to generate a plurality of audio segments corresponding to the at least one attendee. In addition, a speaker grouping sub-module in the speech recognition module is configured to perform speech recognition on the audio segments according to the at least one language family recognition result to convert the audio segments to a text content. The translation module includes a parallel multilingual translation sub-module, where the parallel multilingual translation sub-module is configured to translate the text content according to the at least one language family recognition result, and transmit the translated text content for displaying on the at least one terminal apparatus.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

A method of the present invention would handle the above situations, such as homophones and multi-speaker environment as follows. In the present invention, for the problems caused by homophones, language family recognition is performed on words and phrases before a speech recognition phase, to narrow a scope of the words and phrases for the recognition. In this way, the confusion caused by homophones in different language families can be mitigated, and the efficiency and the accuracy of speech recognition can be improved. Furthermore, in the present invention, for the multi-speaker environment, speech features of a plurality of speakers are automatically segmented and marked. In the present invention, during consecutive speech recognition, the quantity of speakers is detected through a camera, those speech features in the audio content are grouped according to the quantity of the speakers, and recognition is performed after the grouping is completed, thereby improving readability of a recognition result.

Figure 1:
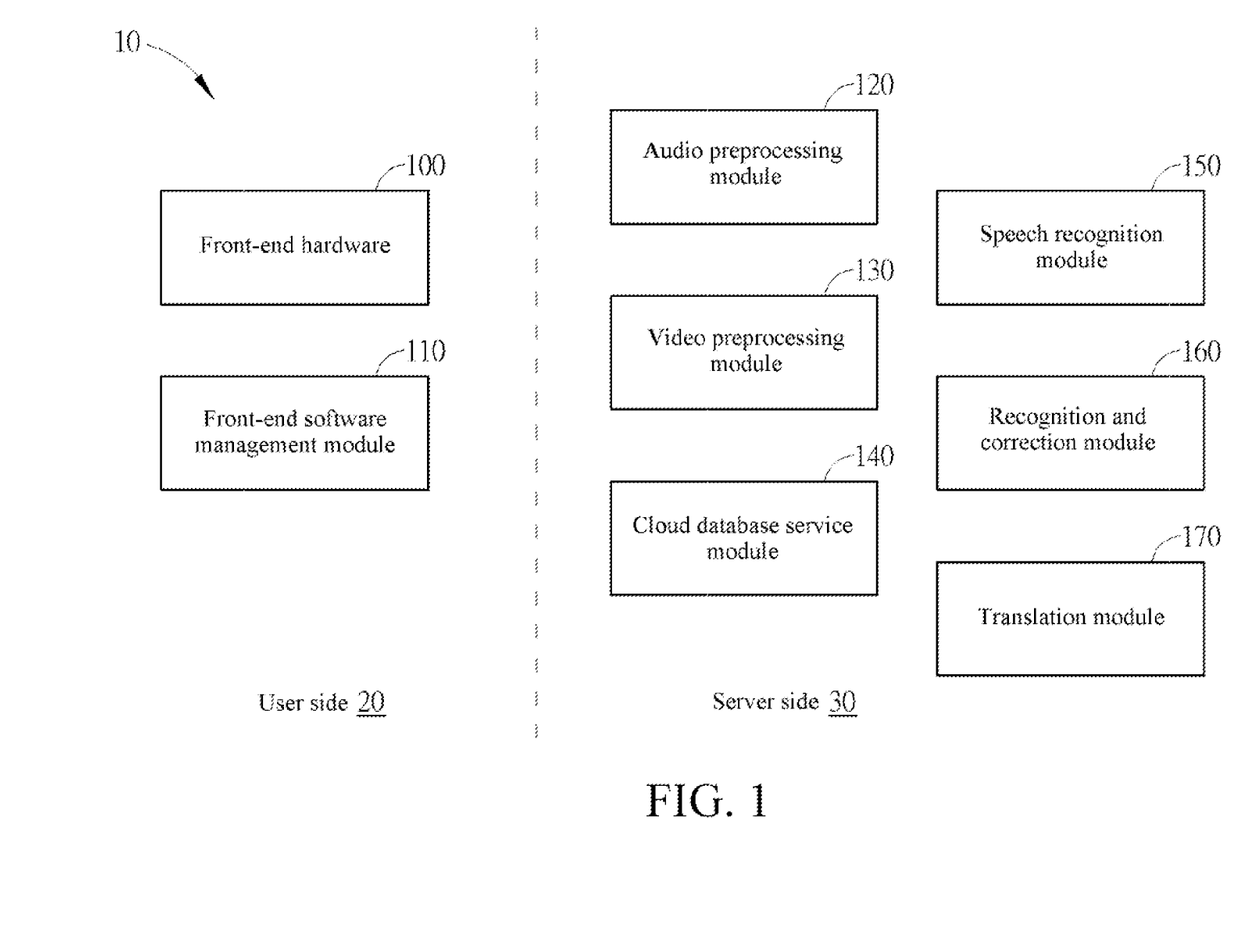
FIG. 1 is a schematic diagram of a multilingual speech recognition and translation system according to an embodiment of the present invention.

FIG. 1 is a schematic diagram of a multilingual speech recognition and translation system 10 according to an embodiment of the present invention. As shown in the figure, the multilingual speech recognition and translation system 10 of the present invention includes a terminal apparatus 20 and a server 30. The terminal apparatus 20 includes a front-end hardware 100 and a front-end software management module 110, and the server 30 includes an audio pre-processing module 120, a video pre-processing module 130, a cloud database service module 140, and a speech recognition module 150, a recognition and correction module 160, and a translation module 170. The terminal apparatus 20 and the server 30 may be connected via one or more wired/wireless network cables.

FIG. 2A to FIG. 2H further illustrate main units constituting each of modules, such as the front-end hardware 100, the front-end software management module 110, the audio pre-processing module 120, the video pre-processing module 130, the cloud database service module 140, the speech recognition module 150, the recognition and correction module 160, and the translation module 170.

Figure 2A:
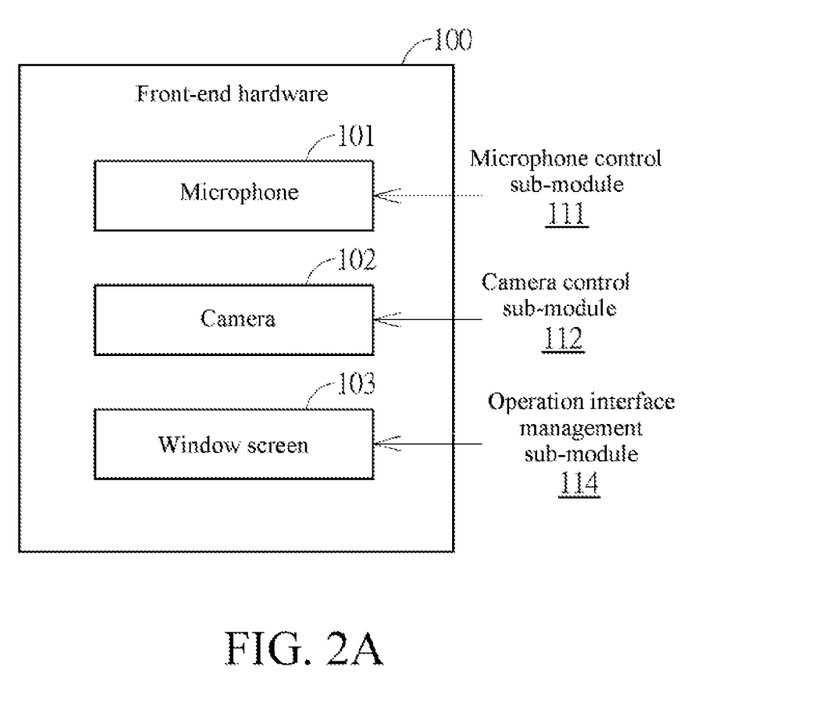
FIG. 2A to FIG. 2H are schematic diagrams of the modules in the multilingual speech recognition and translation system according to the present invention.

The front-end hardware 100 of the terminal apparatus 20 includes one or more microphones 101, one or more cameras 102, and one or more window screens 103. The front-end hardware 100 may be electronic apparatuses (for example, personal computers, notebook computers, tablet computers, smart phones, or embedded systems) used by different attendees in a conference. For example, the microphone 101 may be a radio apparatus embedded in or externally connected to the aforementioned electronic apparatus, the camera 102 may be a webcam embedded in or externally connected to the electronic apparatus, and the window screen 103 includes a screen and an input apparatus (for example, a mouse, a touch pad, a keyboard, etc.) of the electronic apparatus. In some embodiments of the present invention, it is possible that the electronic apparatuses owned by only a certain number of attendees are equipped with the microphone 101 and the camera 102. However, since speech recognition and translation results need to be presented to every attendee in the conference, in a preferred embodiment of the present invention, the electronic apparatuses of all attendees in the conference are equipped with the window screen 103 on which a conference video and speech contents of the attendees can be seen in real time.

Figure 2B:
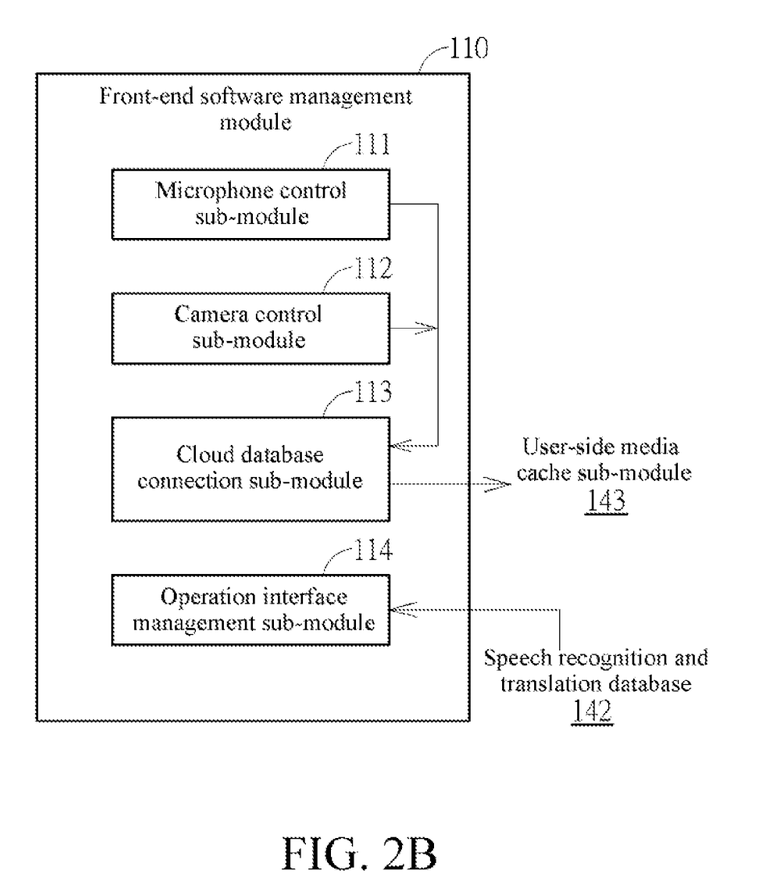

The front-end software management module 110 is configured to manage settings of the front-end hardware 100 in the same electronic apparatus or different electronic apparatuses. For example, the front-end software management module 110 disposed on an electronic apparatus A may share a sound of the microphone 101 or a video of the camera 102 with an electronic apparatus B through a wireless or wired connection. Furthermore, the front-end software management module 110 includes a microphone control sub-module 111, a camera control sub-module 112, a cloud database connection sub-module 113, and an operation interface management sub-module 114. A function of the microphone control sub-module 111 is to activate a recording function of one or more microphones 101 in the front-end hardware 100, and determine the most proper recording parameter (e.g. a sampling rate, etc.) according to a current scenario (e.g. an attendance), so that one or more microphones 101 capture audio to generate audio data. A function of the camera control sub-module 112 is to activate a recording function of one or more cameras 102 in the front-end hardware 100, and determine the most proper recording parameter according to a current scenario, so that the one or more cameras 102 can capture videos to generate video data. A function of the cloud database connection sub-module 113 is to upload the audio data captured by the one or more microphones 101 and the video data captured by the one or more cameras 102 in the front-end hardware 100 to the cloud database service module 140 (for example, in a form of streaming). It should be noted that the quantities of the microphones 101, the cameras 102, and the window screens 103 to be activated are not specified in the above description since they are related to a conference type. For example, in a remote conference, the microphones 101, the cameras 102, and the window screens 103 disposed at different positions may all be needed to capture audio and video data of conference attendees at different positions and provide a translation result to each of the conference attendees. Only in this way can a normal operation of the multilingual speech recognition and translation system of the present invention be ensured. However, when the conference is held in only one place, the multilingual speech recognition and translation system of the present invention can operate normally only by activating a few microphones 101, a few cameras 102, and a few window screens 103.

Figure 2C:
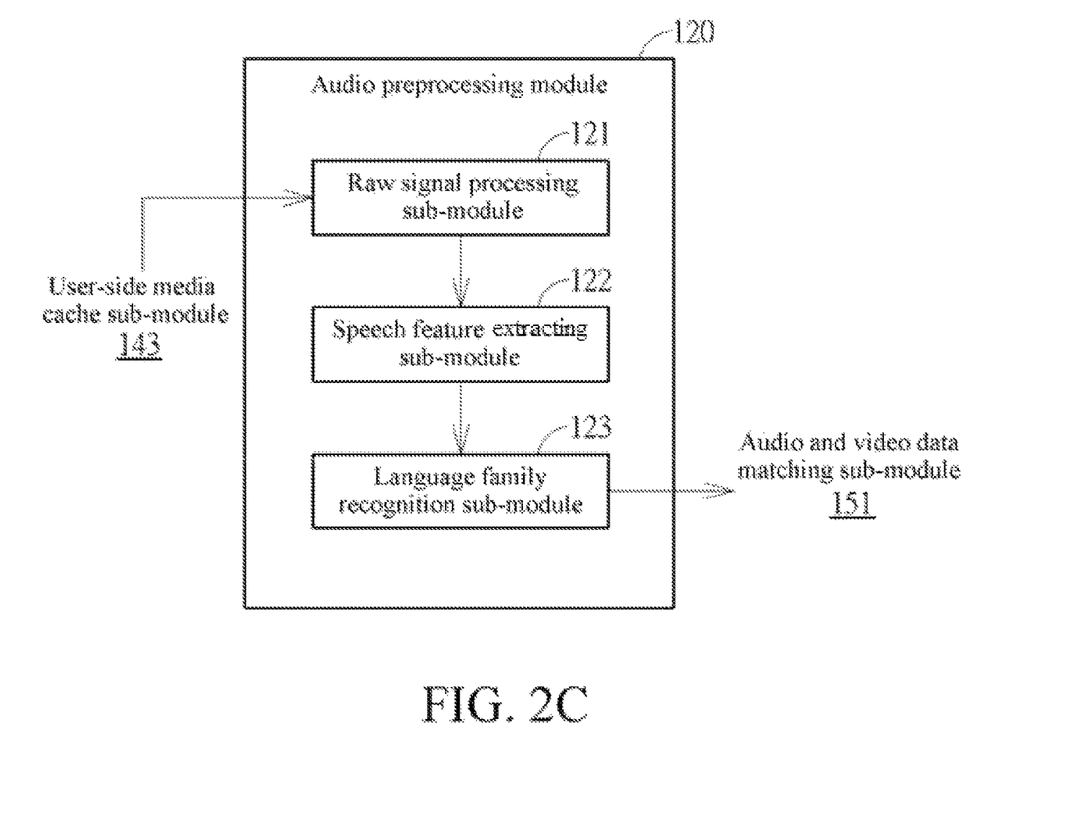
Figure 2D:
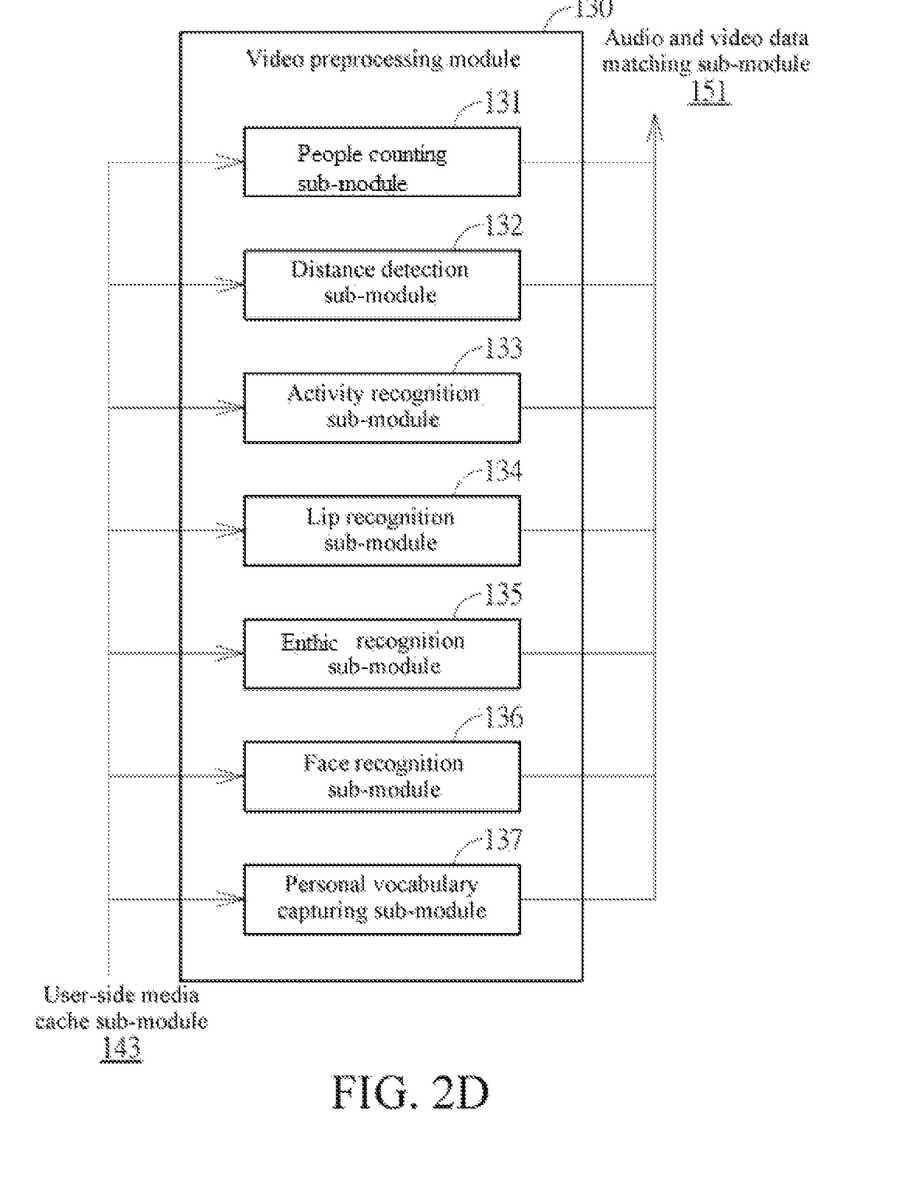

The audio pre-processing module 120 of the server 30 is configured to receive audio data generated by the terminal apparatus 20. In detail, the audio pre-processing module 120 includes a raw signal processing sub-module 121, a speech feature extracting sub-module 122, and a language family recognition sub-module 123. The raw signal processing sub-module 121 is configured to process raw audio signals captured from the one or more microphones 101 and output an audio signal. The speech feature extracting sub-module 122 is configured to extract speech feature data from the audio signal. The language family recognition sub-module 123 is configured to compare the extracted speech feature data with a known language family recognition model, so as to preliminarily determine a language family to which the speech belongs. In an embodiment, the language family recognition model may be obtained through performing deep learning on those speeches in different language families The video pre-processing module 130 is configured to receive video data generated by the terminal apparatus 20, and has a speaker's behaviour detection function and a speaker's identity recognition function. The speaker's behaviour detection function is performed through a people counting sub-module 131, a distance detection sub-module 132, an activity recognition sub-module 133, and a lip recognition sub-module 134. The people counting sub-module 131 is configured to recognize a quantity of conference attendees according to the video data captured by the one or more cameras 102. The distance detection sub-module 132 is configured to determine a distance between the conference attendee and the one or more microphones 101 according to the video data. The activity recognition sub-module 133 is configured to compare the video data captured by the one or more cameras 102 with a known human activity model to recognize activities (movements) of the conference attendee. The lip recognition sub-module 134 is configured to recognize lip movements of the speaker according to the video data captured by the one or more cameras 102.

Furthermore, the speaker's identity recognition function is mainly performed through an ethnic recognition sub-module 135, a face recognition sub-module 136, and a personal vocabulary capturing sub-module 137. The ethnic recognition sub-module 135 is configured to compare the video data captured by the one or more cameras 102 with a known ethnic model to recognize an ethnic of each conference attendee. The ethnic recognition sub-module 135 may determine the ethnic of the attendee according to a skin color and a facial contour of the conference attendee. The face recognition sub-module 136 compares the video data captured by the one or more cameras 102 with a known face model to verify an identity of the conference attendee. If the face recognition sub-module 136 recognizes the conference attendee (that is, the identity verification succeeds), a language used by the attendee can be directly determined, or languages most frequently used by the conference attendee can be obtained, and the speech recognition and translation are directly performed according to the language family used or frequently used by the attendee in the conference without some recognition processes of the present invention. Furthermore, the personal vocabulary capturing sub-module 137 captures a personal exclusive library of words and phrases (if existing in the cloud database service module 140) from the cloud database service module 140 according to the identity of the conference attendee verified by the face recognition sub-module 136. If the face recognition sub-module 136 cannot recognize the conference attendee (that is, the identity verification fails), the cloud database service module 140 establishes a new personal exclusive library of words and phrases for the attendee in the conference.

Therefore, based on the quantity of conference attendees recognized by the people counting sub-module 131 and the ethnic of the conference attendee recognized by the ethnic recognition sub-module 135, the video pre-processing module 130 can generate the first video recognition result.

Furthermore, based on the distance between the conference attendee and the microphone 101 detected by the distance detection sub-module 132, the body movement of the conference attendee recognized by the activity recognition sub-module 133, and the facial movement of the conference attendee recognized by the lip recognition sub-module 134, the second video recognition result can be obtained. It should be noted that, in different embodiments of the present invention, the first video recognition result and the second video result may be generated simultaneously or non-simultaneously during recognition of the video data. The time sequence change is not a limitation of the present invention.

Figure 2E:
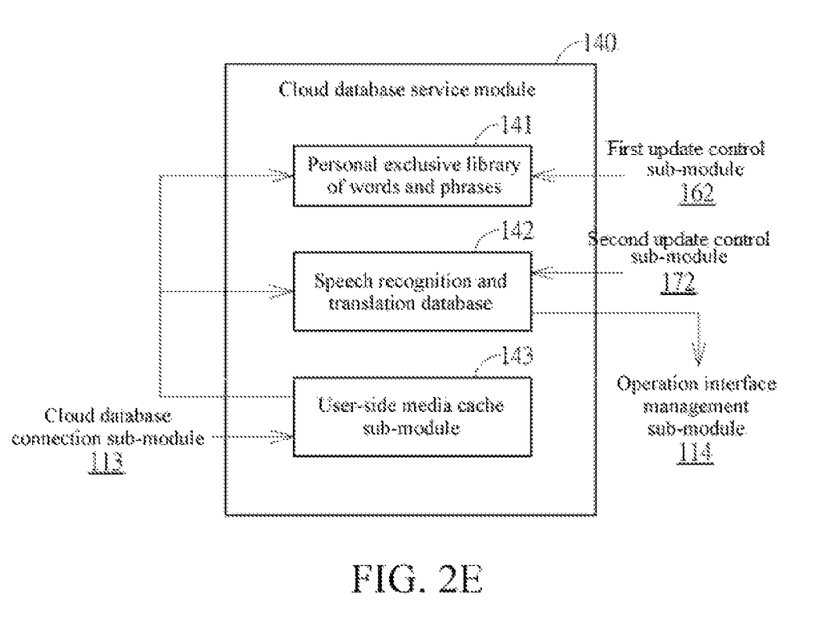
Figure 2F:
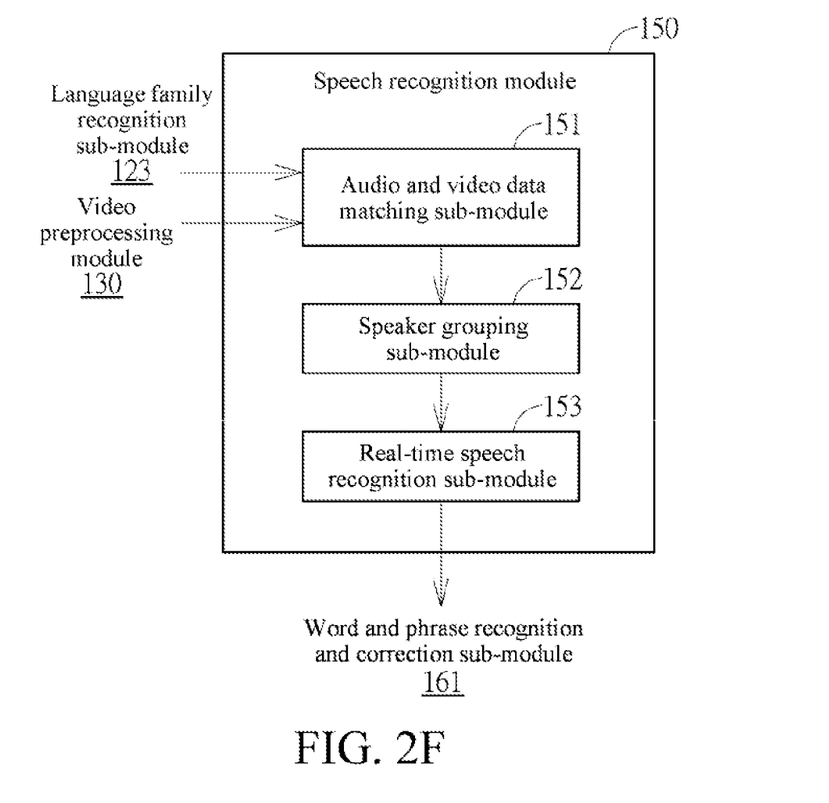

The speech recognition module 150 includes an audio and video data matching sub-module 151, a speaker grouping sub-module 152, and a real-time speech recognition sub-module 153. The audio and video data matching sub-module 151 is configured to match the preliminary language family recognition result generated by the language family recognition sub-module 123 with a recognition result (for example, the first video recognition result) generated by the sub-module in the video pre-processing module 130 to generate a correct language family recognition result. The audio and video data matching sub-module 151 matches ethnic information of the conference attendee recognized by the ethnic recognition sub-module 135 with the preliminary language family recognition result to generate a correct language family recognition result. If the preliminary determination result is inconsistent with the first video recognition result, the language family recognition result is determined according to the preliminary determination result. For example, if the video recognition result indicates that an ethnic of one of the attendees is Asian, but the preliminary determination result of the audio data indicates English, the language family recognition result is mainly based on the preliminary determination result. Furthermore, the speaker grouping sub-module 152 is configured to generate a grouping result corresponding to the audio data. The grouping result shows a plurality of audio segments of the audio data. The speaker grouping sub-module 152 segments a speech in the audio data according to the first video recognition result and the second video recognition result to obtain audio segments corresponding to each of the conference attendees. The real-time speech recognition sub-module 153 converts the audio segments to a text content (that is, converts the speech to specific text) according to the language family recognition result.

In detail, in the present invention, based on the distance between the conference attendee and the microphone 101 detected by the distance detection sub-module 132, the body movement of the conference attendee recognized by the activity recognition sub-module 133, and the facial movement of the conference attendee recognized by the lip recognition sub-module 134, it is determined whether an attendee in the conference is speaking, and then the speech in the audio data is consolidated to determine a start time point and an end time point of speech of each attendee. In this way, the audio data can be split into the plurality of audio segments. Then each of the audio segments can be converted into a text content corresponding to a language indicated by the language family recognition result according to the language family recognition result.

In the embodiments of the present invention, the cloud database service module 140 includes a personal exclusive library of words and phrases 141, a speech recognition and translation database 142, and a terminal apparatus media cache sub-module 143. The personal exclusive library of words and phrases 141 is configured to store personal exclusive words and phrases of each user. It should be noted that the user herein is not necessarily the attendee of the conference. The speech recognition and translation database 142 is configured to store a translation model generated through deep learning. The terminal apparatus media cache sub-module 143 is configured to cache audio data and video data uploaded by the cloud database connection sub-module 113 and provide the audio data and the video data to the sub-modules in the audio pre-processing module 120, the video pre-processing module 130, and the cloud database service module 140 for related processing.

Figure 2G:
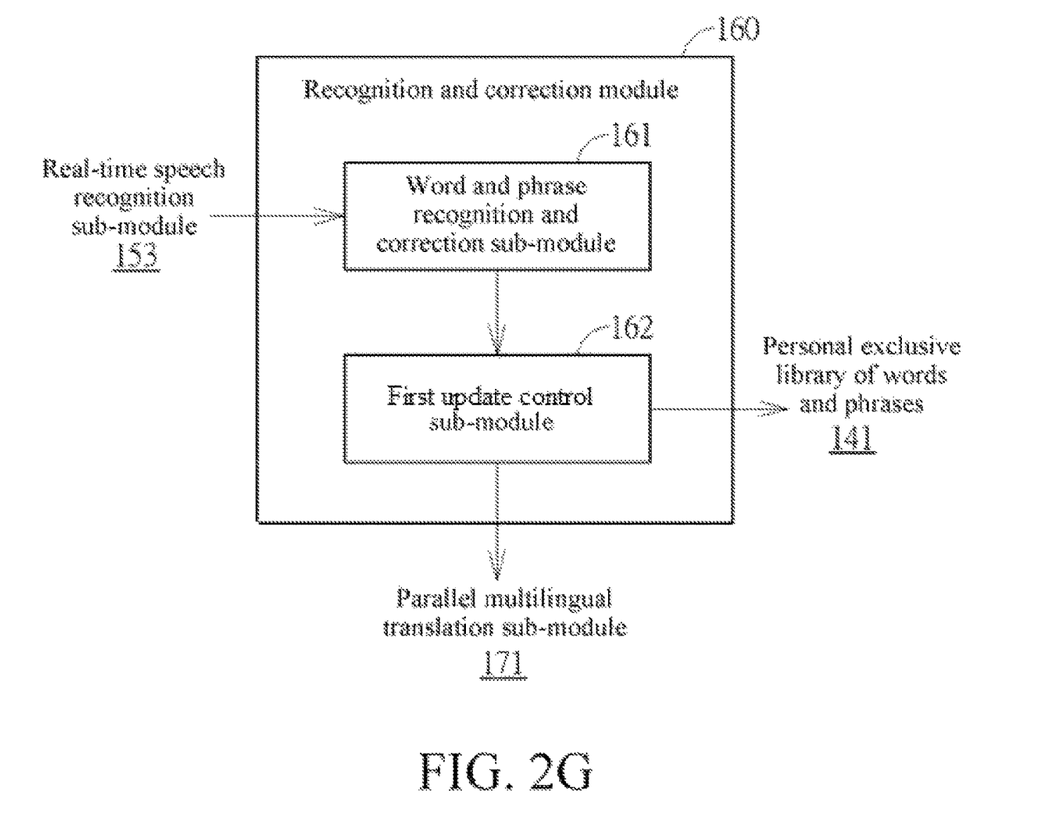

In the embodiments of the present invention, the recognition and correction module 160 includes a word and phrase recognition and correction sub-module 161 and a first update control sub-module 162. The word and phrase recognition and correction sub-module 161 may determine and correct improper words and phrases in the text content obtained by the real-time speech recognition sub-module 153 according to a reference library of words and phrases (not shown in the figure). The first update control sub-module 162 is configured to request, according to the content corrected by the word and phrase recognition and correction sub-module 161, the personal exclusive library of words and phrases 141 to update the content.

Figure 2H:
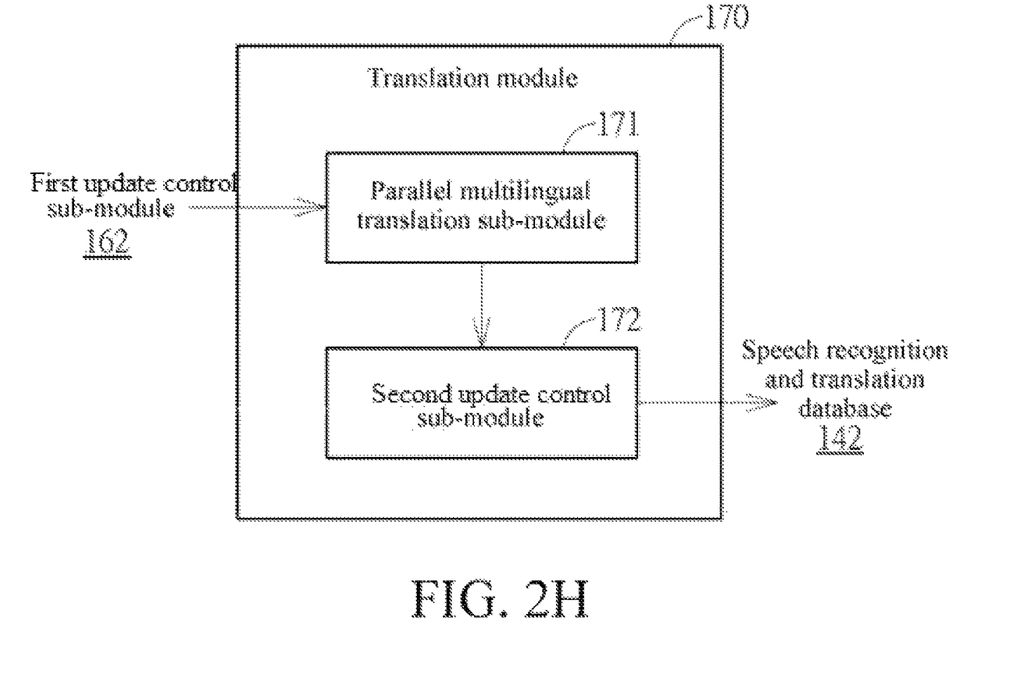

In the embodiments of the present invention, the translation module 170 includes a parallel multilingual translation sub-module 171 and a second update control sub-module 172. The parallel multilingual translation sub-module 171 performs, according to the translation model stored in the speech recognition and translation database 142, multilingual translation on the text content corrected by the word and phrase recognition and correction sub-module 161. The second update control sub-module 172 may be configured to control the speech recognition and translation database 142 to learn the translated text content and update the translation model, so as to improve translation accuracy through iterate learning. In addition, the second update control sub-module 172 may further request, based on a feedback from a user, the speech recognition and translation database 142 to correct the translation model.

Figure 3:
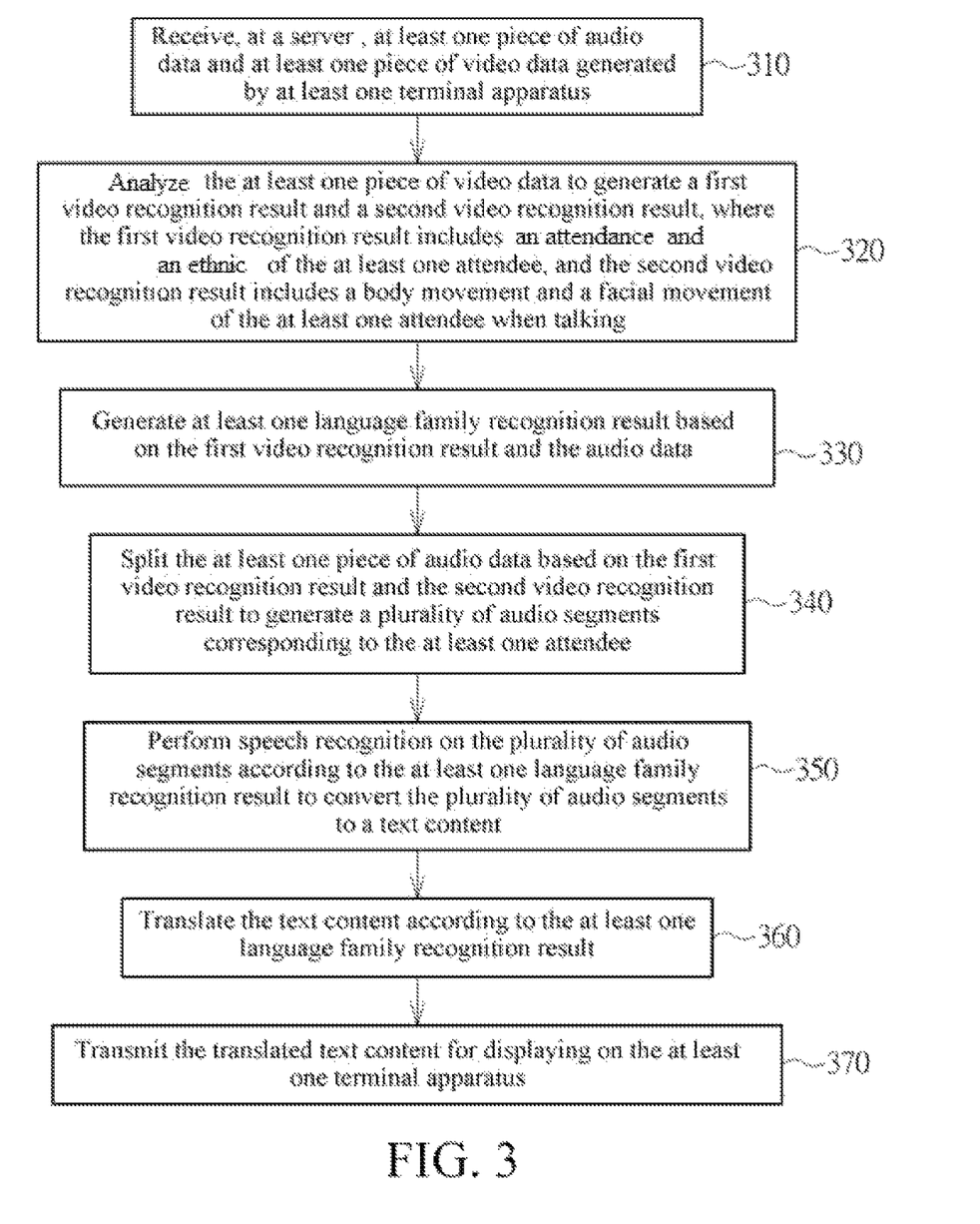
FIG. 3 is a simplified flowchart of a multilingual speech recognition and translation method according to an embodiment of the present invention.

The operations of the above multilingual speech recognition and translation system 10 may be summarized into a multilingual speech recognition and translation method. FIG. 3 is a flowchart of a multilingual speech recognition and translation method according to an embodiment of the present invention. The process includes at least the following steps:

Step 310: Receive, at a server, at least one piece of audio data and at least one piece of video data generated by at least one terminal apparatus.

Step 320: Analyze the at least one piece of video data to generate a first video recognition result and a second video recognition result, where the first video recognition result includes an attendance and an ethnic of the at least one attendee, and the second video recognition result includes a body movement and a facial movement of the at least one attendee when talking.

Step 330: Generate at least one language family recognition result based on the first video recognition result and the audio data.

Step 340: Split the at least one piece of audio data based on the first video recognition result and the second video recognition result to generate a plurality of audio segments corresponding to the at least one attendee.

Step 350: Perform speech recognition on the plurality of audio segments according to the at least one language family recognition result to convert the plurality of audio segments to a text content.

Step 360: Translate the text content according to the at least one language family recognition result.

Step 370: Transmit the translated text content for displaying on the at least one terminal apparatus.

It should be noted that, in other embodiments, the process of the multilingual speech recognition and translation method of the present invention is not limited to the steps and the sequence described above. According to the description of the multilingual speech recognition and translation system of the present invention in the previous paragraphs, the multilingual speech recognition and translation method of the present invention may include more steps to improve an effect of speech recognition and translation. However, for brevity of description, only the steps related to the core concept of the present disclosure and the solutions to the technical problems in the prior art are elaborated herein. Those skilled in the art to which the present invention belongs should be able to fully understand and apply the process of the multilingual speech recognition and translation method of the present invention after having a full understanding of the disclosure content of this specification.

In conclusion, in the present invention, the ethnic of the conference attendee and the language used by the conference attendee are recognized by analyzing facial features of the conference attendee, to obtain a more accurate language family recognition result, thereby resolving the problem caused by homophones. In addition, in the present invention, the activity information of the conference attendee, such as the distance from the microphone, the body movement, and the lip movement is also analyzed, so as to determine the number of speakers and the speaking time of each speaker, and the speech features are also analyzed to determine a conference attendee to which each speech belongs, so as to accurately group the speaker features, thereby resolving the problem caused by the multi-speaker environment. Through the above techniques, the present invention effectively improves the accuracy of the speech recognition. As the accuracy of the speech recognition is improved, the accuracy of translation is also improved. In this way, the multilingual speech recognition and translation system and method of the present invention can provide high-efficiency and high-quality speech recognition and translation functions in multilingual conferences.

The embodiments of the present invention may be implemented by using hardware, software, firmware, and related combinations thereof. By virtue of an instruction execution system, the embodiments of the present invention may be implemented by using software or firmware stored in a memory. Regarding hardware, the embodiments of the present invention may be implemented by applying any of the following technologies or related combinations: an operation logic with logic gates that can perform a logical function based on a data signal, an application specific integrated circuit (ASIC) with a suitable combinational logic gate, and a programmable gate array (PGA), a field programmable gate array (FPGA), etc.

The processes and blocks in the flowcharts in the specification show the architecture, functions, and operations that can be implemented based on the systems, methods, and computer software products of various embodiments of the present invention. In this regard, each block in the flowchart or the functional block diagram may represent a module, a section, or a part of the program code, which includes one or more executable instructions for implementing specified logical functions. In addition, each block in the functional block diagram and/or the flowchart as well as a combination of blocks may substantially be implemented by a dedicated hardware system that performs specified functions or actions or a combination of dedicated hardware and computer program instructions. The computer program instructions may also be stored in a computer-readable medium. The computer-readable medium enables a computer or other programmable data processing apparatuses to work in a specific manner, so that the instructions stored in the computer-readable medium implement the functions/actions specified by the blocks in the flowchart and/or functional block diagram.

The above descriptions are merely preferred embodiments of the present invention, and all equivalent changes and modifications made in accordance with the claims of the present invention shall fall within the scope of the present invention.

What is claimed is:

1. A multilingual speech recognition and translation method for a conference, wherein the conference comprises at least one attendee, and the method comprises:

receiving, at a server, at least one piece of audio data and at least one piece of video data of the at least one attendee from at least one terminal apparatus during the conference;

analyzing the at least one piece of video data to generate a first video recognition result and a second video recognition result, wherein the first video recognition result comprises an attendance and an ethnic of the at least one attendee, and the second video recognition result comprises a body movement and a facial movement of the at least one attendee when talking;

generating at least one language family recognition result based on the first video recognition result and the at least one piece of audio data;

splitting the at least one piece of audio data based on the first video recognition result and the second video recognition result to generate a plurality of audio segments corresponding to the at least one attendee;

performing speech recognition on the audio segments according to the at least one language family recognition result to convert the audio segments to a text content;

translating the text content according to the at least one language family recognition result; and transmitting the translated text content for displaying on the at least one terminal apparatus;

wherein the method further comprises:

determining a quantity of speakers and a speaking time of each speaker according to a distance, in the at least one piece of video data, between the at least one attendee and a microphone to generate the second video recognition result; and obtaining the plurality of audio segments according to the second video recognition result.

2. The method according to claim 1, further comprising:

extracting speech feature data from the at least one piece of audio data; and comparing the extracted speech feature data with a language family recognition model to generate a preliminary determination result.

3. The method according to claim 2, wherein the step of generating the at least one language family recognition result based on the first video recognition result and the audio data comprises:

determining at least one language family comprised in the at least one piece of audio data according to the preliminary determination result and the first video recognition result, and if the preliminary determination result is inconsistent with the first video recognition result, determining the at least one language family according to the preliminary determination result.

4. The method according to claim 1, further comprising:

verifying an identity of the at least one attendee according to the at least one piece of video data;

when the identity verification succeeds, accessing, from a cloud database service module, a personal exclusive library of words and phrases related to the at least one attendee and enhancing and improving a speech recognition result and a translation result for the at least one attendee according to the personal exclusive library of words and phrases; and when the identity verification fails, establishing a new personal exclusive library of words and phrases for the at least one attendee.

5. The method according to claim 4, further comprising:

modifying the personal exclusive library of words and phrases according to a user feedback from the at least one attendee.

6. The method according to claim 1, wherein the step of splitting the at least one piece of audio data to generate the audio segments corresponding to the at least one attendee comprises:

determining a start time point and an end time point of each speech of the at least one attendee to obtain the audio segments according to the facial movement, in the second video recognition result, of the at least one attendee when talking.

7. The method according to claim 1, further comprising:

correcting the text content according to a reference library of words and phrases.

8. A server for a conference, wherein the conference comprises at least one attendee, and the server comprises:

an audio pre-processing module configured to receive at least one piece of audio data generated by at least one terminal apparatus;

a video pre-processing module configured to receive at least one piece of video data generated by the at least one terminal apparatus and generate a first video recognition result and a second video recognition result according to the at least one piece of video data, the audio pre-processing module generating at least one language family recognition result based on the first video recognition result and the at least one piece of audio data, wherein the first video recognition result comprises an attendance and an ethnic of the at least one attendee, and the second video recognition result comprises a body movement and a facial movement of the at least one attendee when talking;

a speech recognition module configured to split the at least one piece of audio data based on the first video recognition result, and the second video recognition result, to generate a plurality of audio segments corresponding to the at least one attendee, wherein the speech recognition module comprises a real-time speech recognition sub-module configured to perform speech recognition on the audio segments according to the at least one language family recognition result to convert the audio segments to a text content; and a translation module comprising a parallel multilingual translation sub-module, wherein the parallel multilingual translation sub-module is configured to translate the text content according to the at least one language family recognition result and transmit the translated text content for displaying on the at least one terminal apparatus;

wherein the video pre-processing module comprises:

a distance detection sub-module configured to determine a quantity of speakers and a speaking time of each speaker according to a distance, in the at least one piece of video data, between the at least one attendee and a microphone to generate the second video recognition result;

wherein the speech recognition module obtains the plurality of audio segments according to the second video recognition result.

9. The server according to claim 8, wherein the video pre-processing module further comprises:

a face recognition sub-module configured to verify an identity of the at least one attendee according to the video data; and a personal vocabulary capturing sub-module configured to access a personal exclusive library of words and phrases related to the at least one attendee when the identity verification succeeds, wherein the parallel multilingual translation sub-module generates a translation result based on the personal exclusive library of words and phrases.

10. The server according to claim 9, further comprising a cloud database service module configured to establish the personal exclusive library of words and phrases related to the at least one attendee, wherein when the identity verification fails, the cloud database service module establishes a new personal exclusive library of words and phrases for the at least one attendee.

11. The server according to claim 9, further comprising a recognition and correction module, wherein the recognition and correction module comprises an update control sub-module configured to modify the personal exclusive library of words and phrases according to a user feedback from the at least one attendee.

12. The server according to claim 8, wherein the audio pre-processing module further comprises:
a speech feature extracting sub-module configured to extract speech feature data from the at least one piece of audio data; and a language family recognition sub-module configured to compare the extracted speech feature data with a language family recognition model to generate a preliminary determination result.

13. The server according to claim 12, wherein the video pre-processing module further comprises a people counting sub-module and an ethnic recognition sub-module, wherein the people counting sub-module is configured to determine the attendance according to the at least one video data, and the ethnic recognition sub-module is configured to recognize the ethnic of the at least one attendee according to the at least one video data; and the speech recognition module further comprises an audio and video data matching sub-module configured to determine at least one language family comprised in the at least one piece of audio data according to the preliminary determination result and the first video recognition result.

14. The server according to claim 8, wherein the video pre-processing module further comprises:
an activity recognition sub-module configured to recognize the body movement of the at least one attendee in the video data; and
a lip recognition sub-module configured to recognize the facial movement of the at least one attendee in the video data.

15. The server according to claim 8, wherein the speech recognition module further comprises a speaker grouping sub-module configured to determine a start time point and an end time point of each speech of the at least one attendee, based on the distance between the at least one attendee and the microphone, the body movement and the facial movement of the at least one attendee, and the at least one piece of audio data, to obtain the audio segments.

16. The server according to claim 8, further comprising:
a word and phrase recognition and correction sub-module configured to correct the text content according to a reference library of words and phrases.

* * * * *